H. VAN HOEVENBERGH.

Improvement in Printing Telegraphs.

No. 120,133.          Patented Oct. 17, 1871.

H. Van Hoevenbergh,
Lemuel W. Serrell
Atty

Witnesses,
Chas. H. Smith
Harold Serrell ary arms *r s*, and the arm *s* arrests the move-
UNITED STATES PATENT OFFICE.

HENRY VAN HOEVENBERGH, OF NEW YORK, N. Y.

IMPROVEMENT IN PRINTING-TELEGRAPHS.

Specification forming part of Letters Patent No. 120,133, dated October 17, 1871.

*To all whom it may concern:*

Be it known that I, HENRY VAN HOEVENBERGH, of the city and State of New York, have invented an Improvement in Printing-Telegraphs; and the following is declared to be a correct description of the same.

Printing-telegraphs have before been made, with two type-wheels in line with each other, but revolved independently, so that one can be operated while the other remains quiescent. In machines of this character it is usual to stop one type-wheel at the nonius or dash-point, while the other is made use of; but sometimes a letter will be missed and the type-wheel will not properly print when again set going.

My invention is made to set the type-wheels in their correct positions; and consists in connecting latches or catches that are so positioned and operated that the type-wheel that is moved by the step-by-step motion keeps turning the type-wheel that would otherwise be quiescent until it is set or arrives at the nonius or dash-point. By this construction it becomes impossible for either type-wheel to remain out of unison while the other wheel is being operated, because a movement given to either one brings the other to its proper place and there leaves it.

Figure 1:
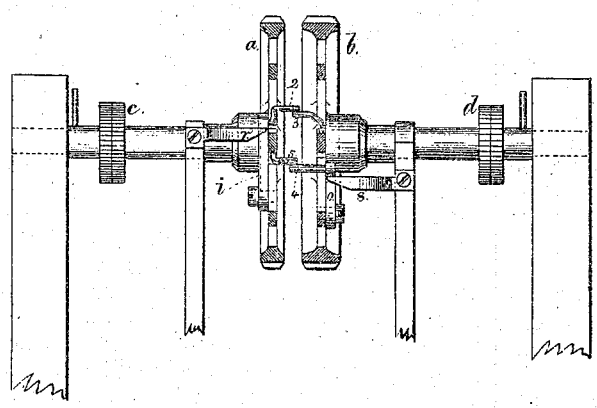
Figure 2:
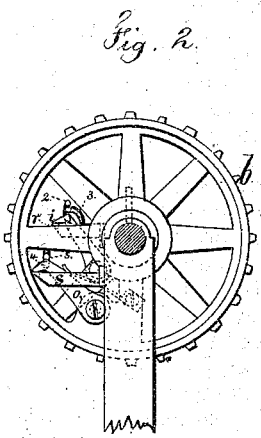

In the drawing, Figure 1 is an elevation of the apparatus with the type-wheels in section. Fig. 2 is a view endwise of the type-wheel shafts, and Fig. 3 is a section illustrating a modification of the disconnecting and connecting devices.

The type-wheels *a b* are upon independent shafts or sleeves, and operated by a step-by-step movement of any desired character, the ratchet-wheels *c d* being shown for the pawls as usual. Upon the wheel *a* is a pawl, *i*, with an arm, 2, contiguous to the pin 3 on the wheel *b*, or equidistant from the center, so as to come in contact therewith, and upon the wheel *b* is a pawl, *o*, with an arm, 4, taking the pin 5 on the wheel *a*. Two arms, *r* and *s*, project from the frame of the machine into the path of the inclined ends of the pawls *i* and *o*, and as the respective wheels and pawls come around, the inclined ends of the spring-pawls come into contact with such fixed arms.

The parts are to be properly positioned, and, for illustration, suppose the wheel *b* to have been in use, then the operator manipulates the wheel *a*, and as it comes around the arm 2 on the pawl *i*, takes the pin 3, and the two wheels move together until the pawls *i o* arrive at the the stationary arms *r s*, and the arm *s* arrests the movement of the wheel *b*, while the wheel *a* is moved forward, and the arm 2 lifted over the pin 3, so as to allow the wheel *b* to remain stationary, and this will be done every time the wheel *a* is brought around, thereby the wheel *b* will remain at the the nonius or dash-point, and be in proper position to start, when required, with all the other wheels in the various instruments in the line that are operated simultaneously. If the power to move is applied to the wheel *b*, and the wheel *a* should not have been stopped at the nonius or unison-point, then the wheel *b* will carry the wheel *a* around to that point and leave it, the same as before described, the arm *s* lifting the pawl *o* so as to clear the finger 4 from the pin 5.

Figure 3:
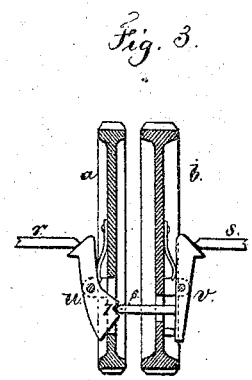

The same operations are performed by the devices shown in Fig. 3, but the pawls *u* and *v* are provided with V-shaped point 6 and notch 7, and these pawls are positioned nearly at right angles to the radial lines, and the arms *r s* act as before and draw back the point or notch to clear the other pawl and allow the wheel to stop at the nonius or unison point.

These stops and pawls may be applied upon arms or disks upon the type-wheel shafts instead of upon the type-wheels themselves, and act as before described.

I claim as my invention—

The method herein specified of causing one type-wheel to set the adjacent type-wheel by moving it around to the designated point, and there leaving the same, substantially as set forth.

Dated July 27, A. D. 1871.

HENRY VAN HOEVENBERGH.

Witnesses:
 CHAS. H. SMITH,
 GEO. T. PINCKNEY. (50)